(12) United States Patent
Hsieh et al.

(10) Patent No.: US 11,785,353 B1
(45) Date of Patent: Oct. 10, 2023

(54) IMAGE SENSOR CHIP AND SENSING METHOD THEREOF

(71) Applicant: National Tsing Hua University, Hsinchu (TW)

(72) Inventors: Chih-Cheng Hsieh, Hsinchu (TW); Min-Yang Chiu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/965,775

(22) Filed: Oct. 14, 2022

(30) Foreign Application Priority Data

May 11, 2022 (TW) ................................. 111117632

(51) Int. Cl.
*H04N 25/42* (2023.01)
*H04N 25/50* (2023.01)
*H04N 25/75* (2023.01)

(52) U.S. Cl.
CPC ............. *H04N 25/42* (2023.01); *H04N 25/50* (2023.01); *H04N 25/75* (2023.01)

(58) Field of Classification Search
CPC ......... H04N 25/42; H04N 25/50; H04N 25/75
See application file for complete search history.

(56) References Cited

U.S. PATENT DOCUMENTS

| 9,876,946 | B2 * | 1/2018 | Ikeda | ................ | H01L 27/14636 |
| 2022/0247953 | A1 * | 8/2022 | Hsieh | ................ | H01L 27/14643 |

FOREIGN PATENT DOCUMENTS

CN 208987026 6/2019

OTHER PUBLICATIONS

Tzu-Hsiang Hsu et al., "A 0.8 V Multimode Vision Sensor for Motion and Saliency Detection With Ping-Pong PWM Pixel", IEEE Journal of Solid-State Circuits, Aug. 2021, pp. 1-9. (Year: 2021).*
Tzu-Hsiang Hsu et al., "A 0.8 V Multimode Vision Sensor for Motion and Saliency Detection With Ping-Pong PWM Pixel", IEEE Journal of Solid-State Circuits, Aug. 2021, pp. 1-9.
"Office Action of Taiwan Counterpart Application", dated Dec. 29, 2022, p. 1-p. 6.

* cited by examiner

*Primary Examiner* — Nhan T Tran
(74) *Attorney, Agent, or Firm* — JCIPRNET

(57) ABSTRACT

An image sensor chip and a sensing method thereof are disclosed. The image sensor chip includes pixel units. Each pixel unit includes a reset switch, a sampling switch, a light sensing element, a capacitor, and an output circuit. The sampling switch is coupled between the reset switch and the light sensing element. The capacitor is coupled between the sampling switch and the output circuit. The output circuit outputs difference information corresponding to a difference between a plurality of sensing results of the light sensing element in different frame periods to a corresponding readout line. The sampling switch has an ON-time length during an exposure period and an OFF-time length during a readout and clean-up period. A ratio of the ON-time length to the OFF-time length is related to a ratio of a capacitance of the light sensing element to a capacitance of the capacitor.

27 Claims, 13 Drawing Sheets

IMAGE SENSOR CHIP AND SENSING METHOD THEREOF

CROSS-REFERENCE TO RELATED APPLICATION

This application claims the priority benefit of Taiwanese application no. 111117632, filed on May 11, 2022. The entirety of the above-mentioned patent application is hereby incorporated by reference herein and made a part of this specification.

BACKGROUND

Technical Field

The disclosure relates to an image sensing circuit, and more particularly, to an image sensor chip and a sensing method thereof.

Description of Related Art

The implementation of dynamic visual image sensing technology may be divided into two main modes: event-based detection mode and frame-based computation mode. In any case, a pixel array of an existing image sensor does not perform processing (e.g., a frame difference operation) on a sensing result (a sensing data frame generated during one frame period). The existing image sensor outputs a plurality of data frames (raw image frames) to a processor, and then software/firmware running on the processor perform image processing (e.g., a continuous frame difference operation) on the data frames. Generally speaking, the processor is at a great computational burden. The continuous frame difference operation may increase the computational burden of the processor and reduce a frame rate. Furthermore, the processor requires a frame buffer for placing a previous frame to perform the continuous frame difference operation.

SUMMARY

The disclosure provides an image sensor chip and a sensing method thereof for providing a difference between a first sensing result in a first frame period and a second sensing result in a second frame period.

According to an embodiment of the disclosure, the image sensor chip includes a pixel array. The pixel array includes a plurality of pixel units. Each of the pixel units includes a first reset switch, a sampling switch, a light sensing element, a first capacitor, and an output circuit. The first reset switch has a first terminal coupled to a reset voltage. The sampling switch has a first terminal coupled to a second terminal of the first reset switch. The light sensing element is coupled to a second terminal of the sampling switch. The first capacitor has a first terminal coupled to the first terminal of the sampling switch. The output circuit is coupled between a second terminal of the first capacitor and one corresponding readout line of a plurality of readout lines of the pixel array. The output circuit outputs difference information corresponding to a difference between a first sensing result during a first frame period and a second sensing result during a second frame period after the first frame period of the light sensing element to the corresponding readout line when the pixel array operates in a frame difference mode. The sampling switch has an ON-time length during an exposure period. The sampling switch has an OFF-time length during a readout and clean-up period after the exposure period. A ratio of the ON-time length to the OFF-time length is related to a ratio of a capacitance of the light sensing element to a capacitance of the first capacitor.

According to an embodiment of the disclosure, the sensing method includes the following. A sampling switch is turned on during an exposure period when a pixel array operates in a frame difference mode. The sampling switch has an ON-time length during the exposure period. The sampling switch is turned off during a readout and clean-up period after the exposure period when the pixel array operates in the frame difference mode. The sampling switch has an OFF-time length during the readout and clean-up period. A ratio of the ON-time length to the OFF-time length is related to a ratio of a capacitance of a light sensing element to a capacitance of a first capacitor. Difference information corresponding to a difference between a first sensing result during a first frame period and a second sensing result during a second frame period after the first frame period of the light sensing element is output to a corresponding readout line by an output circuit in a pixel unit when the pixel array operates in the frame difference mode.

Based on the foregoing, the image sensor chip according to the embodiments of the disclosure may perform a continuous frame difference operation. The image sensor chip may store the first sensing result during the first frame period (the previous frame). During the second frame period (the current frame) after the first frame period, the image sensor chip may generate the difference between the first sensing result of the previous frame and the second sensing result of the current frame. In addition, the image sensor chip may store the sensing result of the current frame to facilitate performing a continuous frame difference operation again during the next frame period.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
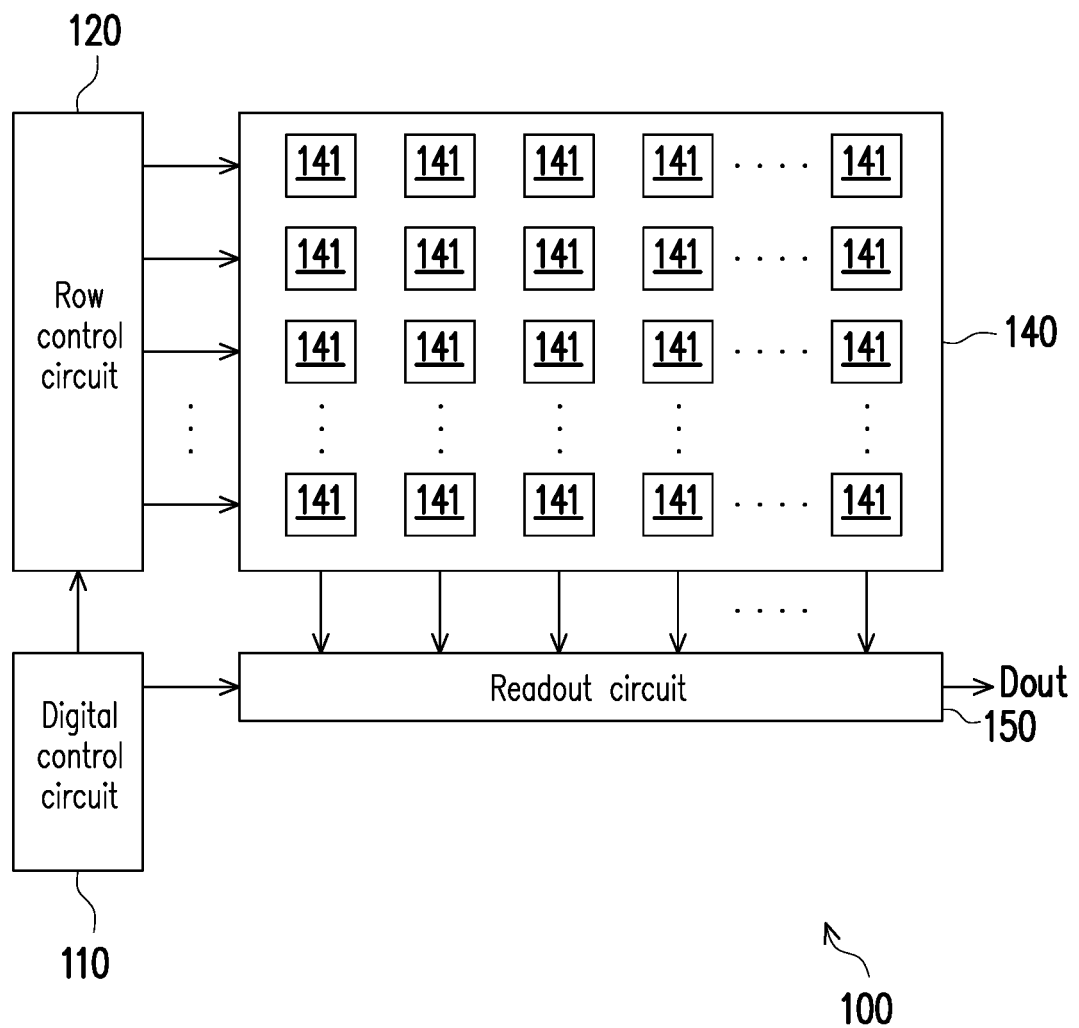
FIG. 1 is a schematic circuit block diagram of an image sensor chip according to an embodiment of the disclosure.

The term "coupling (or connection)" as used throughout this specification (including the claims) may refer to any direct or indirect connection means. For example, if it is herein described that a first device is coupled (or connected) to a second device, it should be interpreted that the first device may be directly connected to the second device, or the first device may be indirectly connected to the second device through other devices or some connection means. Terms such as "first" and "second" mentioned through out the description (including the claims) are used to name elements, or to distinguish between different embodiments or scopes, and are not used to limit the upper or lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic circuit block diagram of an image sensor chip 100 according to an embodiment of the disclosure. The image sensor chip 100 shown in FIG. 1 includes a digital control circuit 110, a row control circuit 120, a pixel array 140, and a readout circuit 150. The readout circuit 150 is coupled to a plurality of readout lines of the pixel array 140. The digital control circuit 110 may control the row control circuit 120 and the readout circuit 150 to output an image stream Dout according to the operating parameters set by the system. For example, the image sensor chip 100 may selectively operate in any one of a raw image mode, a frame difference mode, an event report mode, a local binary pattern (LBP) mode, and a region of interest (ROI) mode based on the control of the digital control circuit 110.

The pixel array 140 includes a plurality of pixel units 141. The row control circuit 120 may output a control signal (e.g., a control signal of a switch and a ramp signal) to the pixel units 141 of the pixel array 140 based on the control of the digital control circuit 110. For example, the row control circuit 120 may reset a light sensing element of each pixel unit 141 of the pixel array 140 during a reset period of each frame period, and then each pixel unit 141 of the pixel array 140 may sense an image (incident light) during an exposure period of each frame period. The row control circuit 120 may output a ramp signal to scan the pixel units 141 based on the control of the digital control circuit 110. In addition, the readout circuit 150 may read out a sensing result of the pixel array 140 during a readout period of each frame period to facilitate outputting the image stream Dout based on the control of the digital control circuit 110.

Depending on different design requirements, the digital control circuit 110, the row control circuit 120, and/or the readout circuit 150 may be realized in the form of hardware, firmware, software (i.e., programs), or a combination of a plurality of the three above. In terms of the hardware form, the digital control circuit 110, the row control circuit 120, and/or the readout circuit 150 may be realized as logic circuits on integrated circuits. The relevant functions of the digital control circuit 110, the row control circuit 120, and/or the readout circuit 150 may be realized as hardware utilizing hardware description languages (e.g., Verilog HDL or VHDL) or other suitable programming languages. For example, the relevant functions of the digital control circuit 110, the row control circuit 120, and/or the readout circuit 150 may be realized as various logic blocks, modules, and circuits in one or more controllers, microcontrollers, microprocessors, application-specific integrated circuits (ASICs), digital signal processors (DSPs), field programmable gate arrays (FPGAs), and/or other processing units.

In terms of the software and/or firmware forms, the relevant functions of the digital control circuit 110, the row control circuit 120, and/or the readout circuit 150 may be realized as programming codes. For example, the digital control circuit 110, the row control circuit 120, and/or the readout circuit 150 are realized with general programming languages (e.g., C, C++, or assembly language) or other suitable programming languages. The programming codes may be recorded/stored in a "non-transitory computer-readable medium", including read only memory (ROM), a hard disk drive (HDD), a solid-state drive (SSD), or other storage devices. A central processing unit (CPU), a controller, a microcontroller, or a microprocessor may read and execute the programming codes from the non-transitory computer-readable medium to accordingly realize the relevant functions of the digital control circuit 110, the row control circuit 120, and/or the readout circuit 150.

Figure 2:
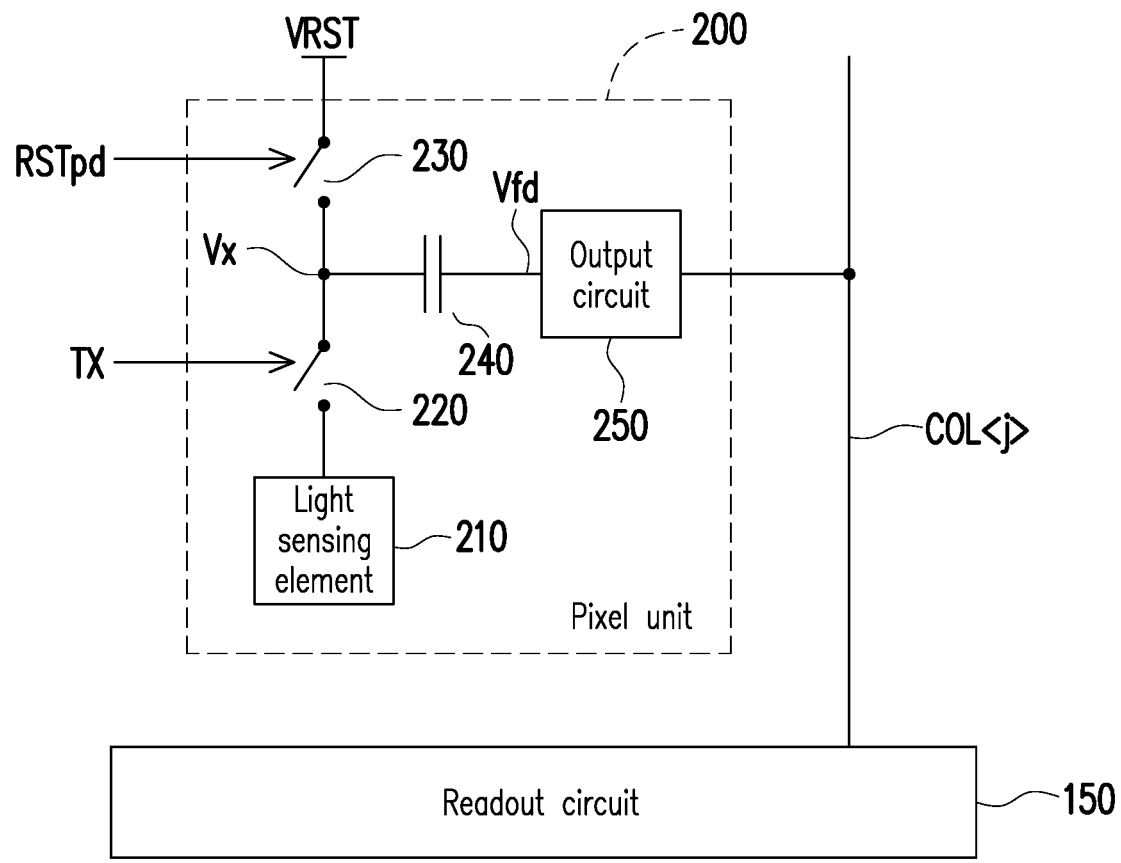
FIG. 2 is a schematic circuit block diagram of a pixel unit according to an embodiment of the disclosure.

FIG. 2 is a schematic circuit block diagram of a pixel unit 200 according to an embodiment of the disclosure. Reference may be made to the relevant description of the pixel unit 200 shown in FIG. 2 for any pixel unit 141 shown in FIG. 1, and/or reference may be made to the relevant description of the pixel unit 141 shown in FIG. 1 for the pixel unit 200 shown in FIG. 2. In the embodiment shown in FIG. 2, the pixel unit 200 includes a light sensing element 210, a sampling switch 220, a reset switch 230, a capacitor 240, and an output circuit 250. Depending on the actual design in some embodiments, the light sensing element 210 may include a photodiode, a light transistor, a photoresistor, or other photosensitive elements.

With reference to FIG. 1 and FIG. 2, a first terminal of the reset switch 230 is coupled to a reset voltage VRST. The level of the reset voltage VRST may be determined depending on the actual design. For example, in some embodiments, the reset voltage VRST may be a system voltage VDD or other voltages. A first terminal of the sampling switch 220 is coupled to a second terminal of the reset switch 230. The light sensing element 210 is coupled to a second terminal of the sampling switch 220. A first terminal of the capacitor 240 is coupled to the first terminal of the sampling switch 220 and the second terminal of the reset switch 230. The output circuit 250 is coupled between a second terminal of the capacitor 240 and one corresponding readout line COL<j> of the plurality of readout lines of the pixel array 140.

When the pixel unit 200 operates in a frame difference mode, each frame period includes a reset period, an exposure period, a readout and clean-up period, and a resample period. The row control circuit 120 may output a reset signal RSTpd to a control terminal of the reset switch 230. The reset switch 230 may be turned on during the reset period of each frame period based on the control of the reset signal RSTpd to reset the light sensing element 210. The reset switch 230 may be turned off during the exposure period after the reset period and a readout period in the readout and clean-up period after the exposure period. The light sensing element 210 may continue to sense incident light after the reset period ends. The reset switch 230 may be turned on during a first sub-period of a clean-up period in the readout and clean-up period. The reset switch 230 may be turned off during a second sub-period of the clean-up period and the resample period after the second sub-period.

The row control circuit 120 may output a sampling signal TX to a control terminal of the sampling switch 220. The sampling switch 220 may be turned on during the reset period and the exposure period after the reset period of each frame period based on the control of the sampling signal TX. The sampling switch 220 may be turned off during the readout and clean-up period after the exposure period. The sampling switch 220 may be turned on during the resample period after the readout and clean-up period.

Figure 3:
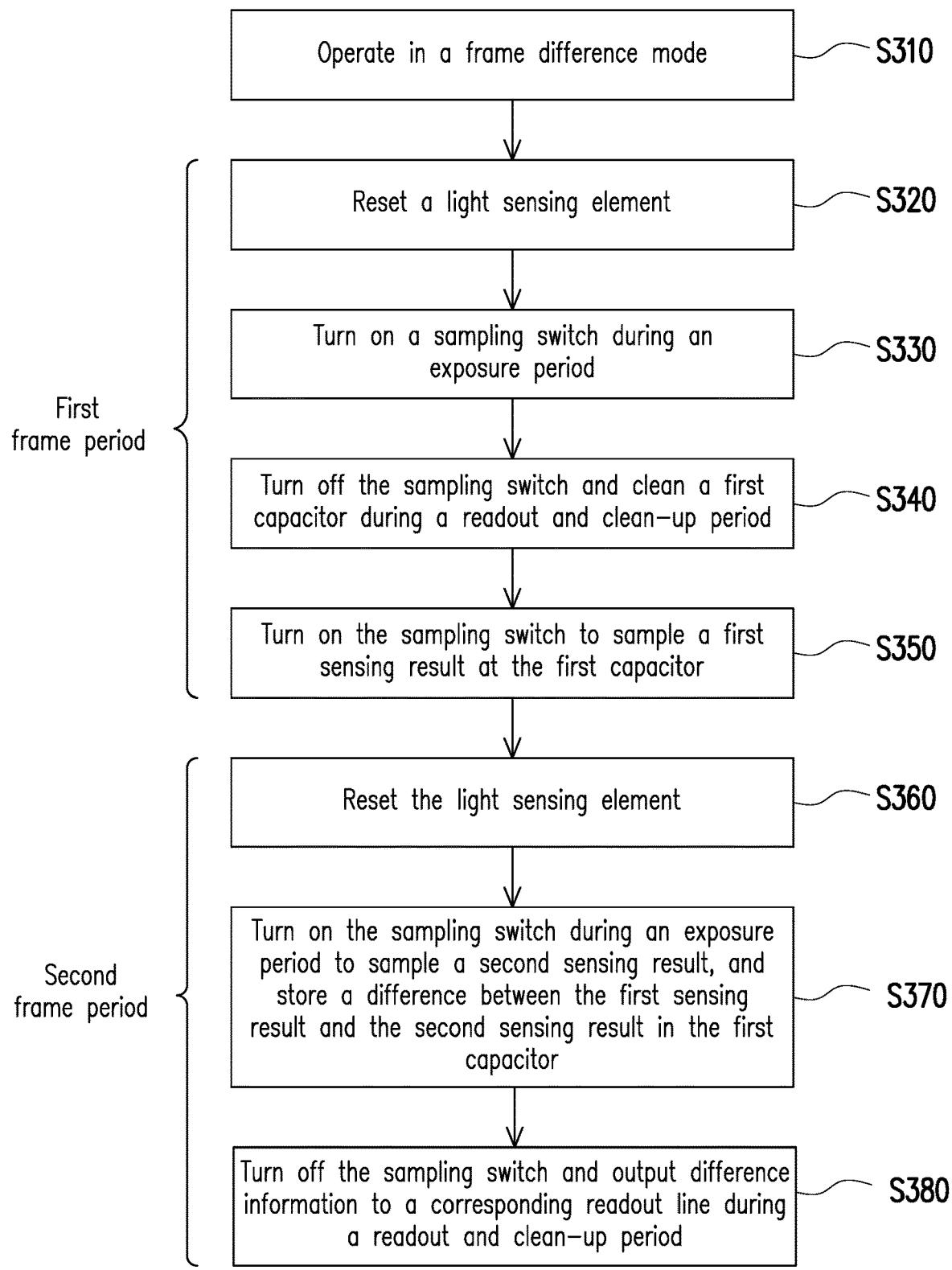
FIG. 3 is a schematic flowchart of a sensing method of an image sensor chip according to an embodiment of the disclosure.

FIG. 3 is a schematic flowchart of a sensing method of an image sensor chip according to an embodiment of the disclosure. The pixel unit 200 shown in FIG. 2 (the pixel unit 141 shown in FIG. 1) may perform the sensing method shown in FIG. 3. With reference to FIG. 1, FIG. 2, and FIG. 3, when the pixel unit 200 operates in a frame difference mode (step S310), the reset switch 230 and the sampling switch 220 may be turned on during a reset period of a first frame period to reset the light sensing element 210 (step S320). The sampling switch 220 may be turned on and the reset switch 230 may be turned off during an exposure period after the reset period (step S330). The light sensing element 210 may generate a first sensing result during the first frame period.

After the exposure period of the first frame period ends, the sampling switch 220 may be turned off during a readout and clean-up period of the first frame period (step S340). The output circuit 250 may read out a second terminal voltage Vfd (i.e., a difference between a sensing result of a previous frame and the first sensing result of a current frame) of the capacitor 240 (a first capacitor), and output difference information corresponding to the difference to the corresponding readout line COL<j> during a readout period in the readout and clean-up period of the first frame period. Then, the output circuit 250 may clean the second terminal voltage Vfd of the capacitor 240 during a clean-up period in the readout and clean-up period (step S340). The sampling switch 220 may be turned on during a resample period after the readout and clean-up period (step S350) to sample the first sensing result of the first frame period at the capacitor 240 (the first capacitor).

The reset switch 230 and the sampling switch 220 may be turned on during a reset period of a second frame period to reset the light sensing element 210 (step S360). The sampling switch 220 may be turned on and the reset switch 230 may be turned off during an exposure period after the reset period (step S370). The light sensing element 210 may generate a second sensing result during the second frame period, and the second sensing result may be sampled at the first terminal (i.e., a first terminal voltage Vx) of the capacitor 240 (the first capacitor). At this time, the second terminal voltage Vfd of the capacitor 240 may represent a difference between the first sensing result and the second sensing result. In other words, the difference between the first sensing result and the second sensing result is stored in the parasitic capacitance of the second terminal of the capacitor 240 (step S370).

After the exposure period of the second frame period ends, the sampling switch 220 may be turned off during a readout and clean-up period of the second frame period (step S380). The output circuit 250 may read out the second terminal voltage Vfd (i.e., the difference between the first sensing result and the second sensing result) of the capacitor 240 (the first capacitor), and output difference information corresponding to the difference to the corresponding readout line COL<j> during a readout period in the readout and clean-up period of the second frame period (step S380).

The time length for which the sampling switch 220 is turned on during the exposure period may be referred to as an "ON-time length" (i.e., the time length of the exposure period). The time length for which the sampling switch 220 is turned off during the readout and clean-up period may be referred to as an "OFF-time length" (i.e., the time length of the readout and clean-up period). A ratio of the "ON-time length" to the "OFF-time length" is related to a ratio of a "capacitance Cpd of the light sensing element 210" to a "capacitance Cm of the capacitor 240". For example, the ratio of the "ON-time length" to the "OFF-time length" of the sampling switch 220 is approximately equal to the ratio of the capacitance Cpd to the capacitance Cm. The capacitance of the light sensing element 210 is, for example, the junction capacitance of the light sensing element 210.

Figure 4:
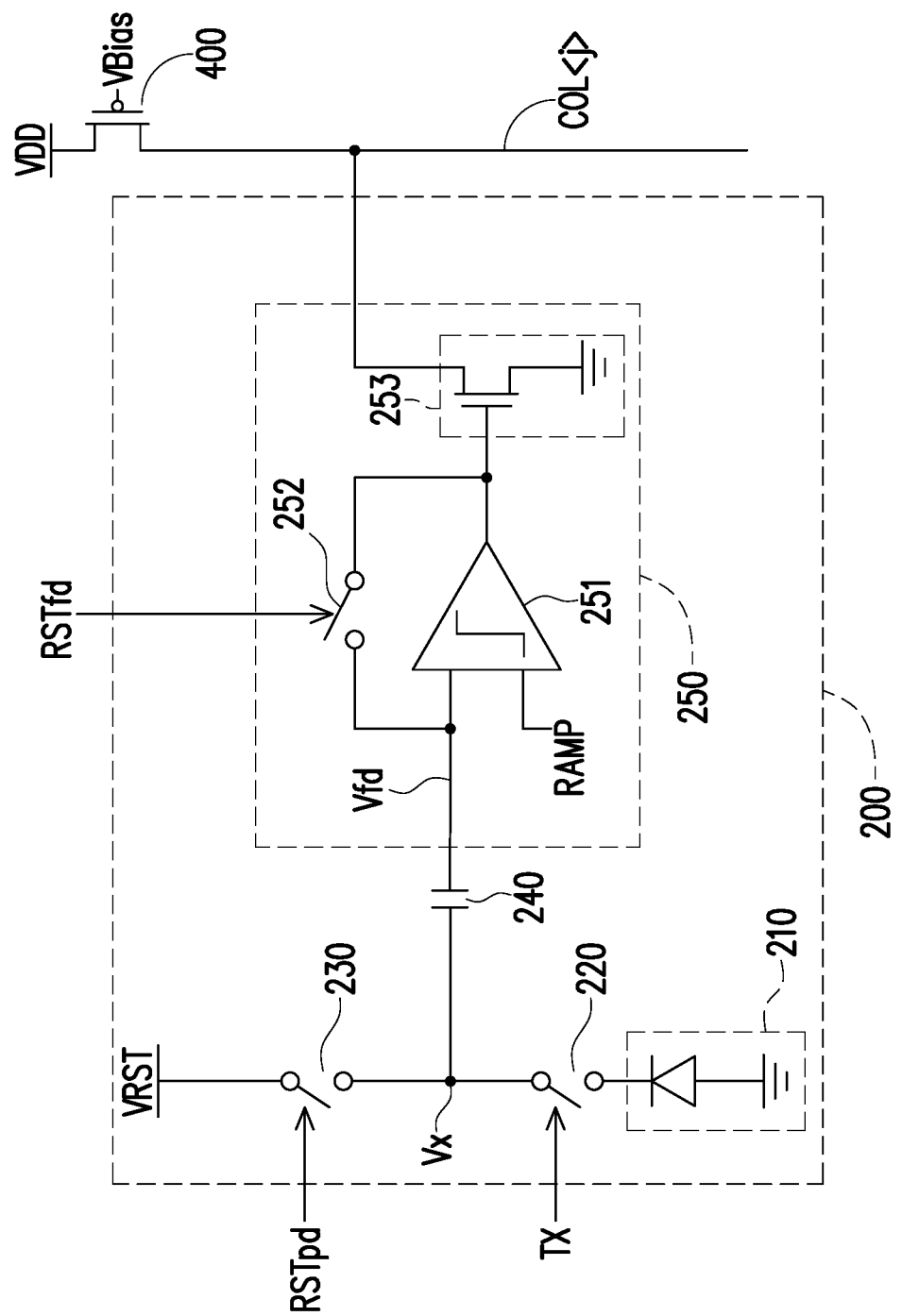
FIG. 4 is a schematic circuit block diagram of the output circuit shown in FIG. 2 according to an embodiment of the disclosure.

FIG. 4 is a schematic circuit block diagram of the output circuit 250 shown in FIG. 2 according to an embodiment of the disclosure. For the pixel unit 200, the light sensing element 210, the sampling switch 220, the reset switch 230, the capacitor 240, and the output circuit 250 shown in FIG. 4, reference may be made to the relevant descriptions of the pixel unit 200, the light sensing element 210, the sampling switch 220, the reset switch 230, the capacitor 240, and the output circuit 250 shown in FIG. 2, which therefore will not be repeated. In the embodiment shown in FIG. 4, the light sensing element 210 may include a photodiode. The cathode of the photodiode is coupled to the second terminal of the sampling switch 220, and the anode of the photodiode is coupled to the a reference voltage (e.g., a ground voltage or other fixed voltages).

The output circuit 250 shown in FIG. 4 includes a comparator 251, a reset switch 252, and a current source 253. A first input terminal of the comparator 251 is coupled to the second terminal of the capacitor 240. The row control circuit 120 may output a ramp signal RAMP to a second input terminal of the comparator 251. A first terminal of the reset switch 252 is coupled to the second terminal of the capacitor 240. A second terminal of the reset switch 252 is coupled to an output terminal of the comparator 251. The row control circuit 120 may output a reset signal RSTfd to a control terminal of the reset switch 252. A control terminal of the current source 253 is coupled to the output terminal of the comparator 251. A current terminal of the current source is coupled to the corresponding readout line COL<j>. In the embodiment shown in FIG. 4, the corresponding readout line COL<j> is also coupled to the drain of a transistor 400. The source of the transistor 400 is coupled to the system voltage VDD. The gate of the transistor 400 is coupled to a bias voltage VBias. The levels of the system voltage VDD and the bias voltage VBias may be determined depending on the actual design.

Operations of the reset switch 230, the sampling switch 220, and the reset switch 252 when the pixel unit 200 operates in the frame difference mode are described here. During the reset period, the reset switch 230 and the sampling switch 220 are turned on to reset the light sensing element 210, and the reset switch 252 is turned off to retain previous frame sensing information in the capacitor 240. The ramp signal RAMP is at a disabling level during the reset period. During the exposure period after the reset period, the reset switches 230 and 252 are turned off, the sampling switch 220 is turned on, and the ramp signal RAMP is maintained at the disabling level.

During the readout period in the readout and clean-up period after the exposure period, the reset switch 230, the sampling switch 220, and the reset switch 252 are each turned off, and the ramp signal RAMP is a ramp waveform. At this time, the comparator 251 may compare the ramp waveform with the second terminal voltage Vfd of the capacitor 240 and output a comparison result to the control terminal of the current source 253. The comparator 251 may convert the ramp signal RAMP into a first current signal, and convert the second terminal voltage Vfd of the capacitor 240 into a second current signal. The comparator 251 may compare the first current signal with the second current signal and output the comparison result to the control terminal of the current source 253. When the first current signal corresponding to the ramp signal RAMP is less than the second current signal corresponding to the second terminal voltage Vfd, the current source 253 does not draw currents from the corresponding readout line COL<j>, and the voltage level of the corresponding readout line COL<j> is therefore pulled up to a high logic level by the transistor 400. When the first current signal corresponding to the ramp signal RAMP is greater than the second current signal corresponding to the second terminal voltage Vfd, the current source 253 draws currents from the corresponding readout line COL<j>, and the voltage level of the corresponding readout line COL<j> is therefore pulled down to a low logic level by the current source 253.

During the clean-up period in the readout and clean-up period, the sampling switch 220 is turned off, the reset switch 230 and the reset switch 252 are each turned on, and the ramp signal RAMP is at an enabling level. At this time, the information stored in the capacitor 240 is cleaned. During the resample period after the clean-up period, the reset switch 230 is turned off, the sampling switch 220 and the reset switch 252 are turned on, and the ramp signal RAMP is maintained at the enabling level. At this time, the sensing result of the light sensing element 210 during a current frame period may be sampled at the first terminal (i.e., the first terminal voltage Vx) of the capacitor 240.

Figure 5:
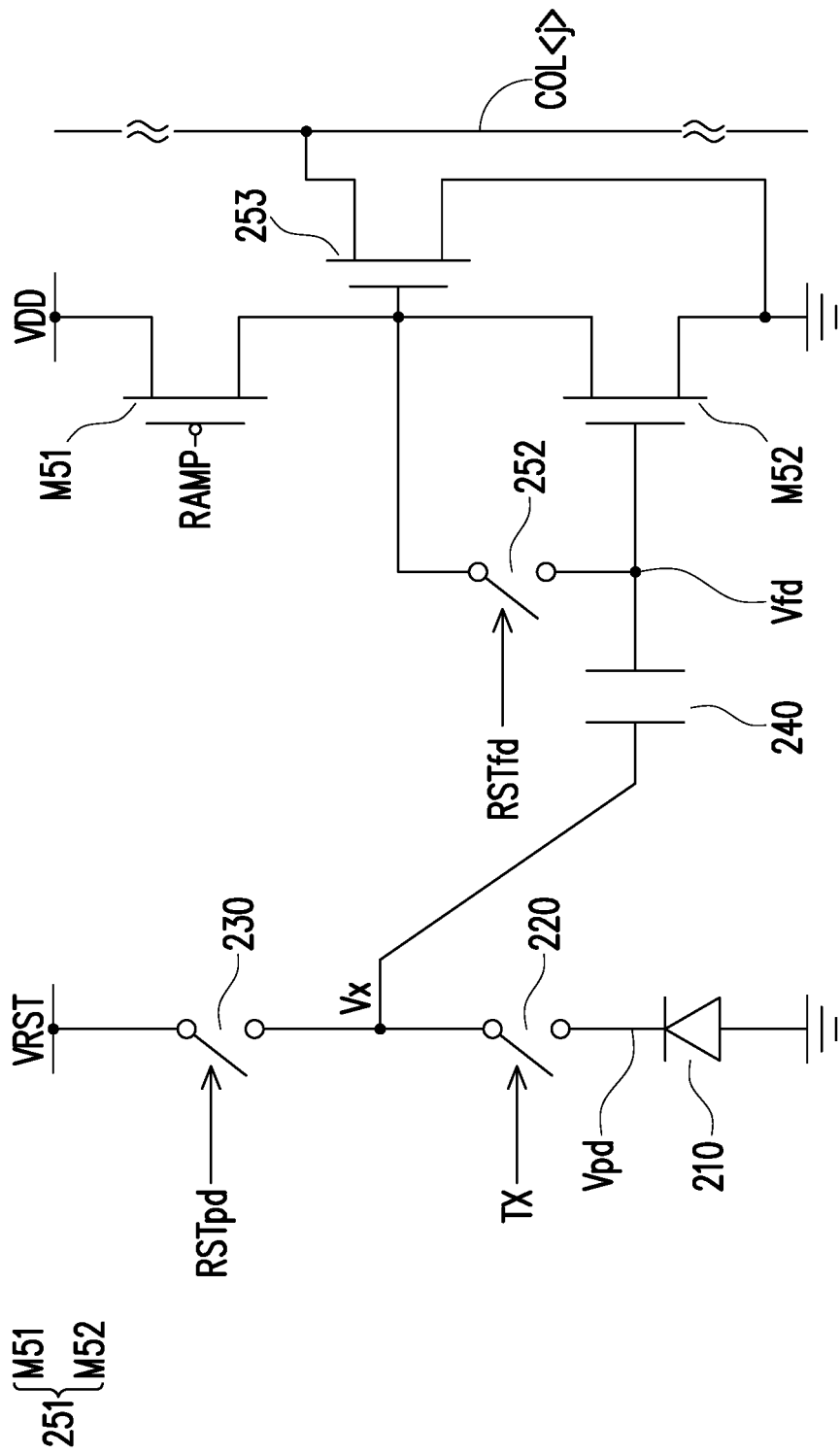
FIG. 5 is a schematic circuit block diagram of the comparator shown in FIG. 4 according to an embodiment of the disclosure.

FIG. 5 is a schematic circuit block diagram of the comparator 251 shown in FIG. 4 according to an embodiment of the disclosure. For the light sensing element 210, the sampling switch 220, the reset switch 230, the capacitor 240, the comparator 251, the reset switch 252, and the current source 253 shown in FIG. 5, reference may be made to the relevant descriptions of the lightسensing element 210, the sampling switch 220, the reset switch 230, the capacitor 240, the comparator 251, the reset switch 252, and the current source 253 shown in FIG. 4, which therefore will not be repeated.

In the embodiment shown in FIG. 5, the comparator 251 may include a transistor M51 and a transistor M52. A control terminal (e.g., a gate) of the transistor M51 is coupled to the second input terminal of the comparator 251 to receive the ramp signal RAMP. A first terminal (e.g., a source) of the transistor M51 receives a first voltage (e.g., the system voltage VDD). A second terminal (e.g., a drain) of the transistor M51 is coupled to the output terminal of the comparator 251, i.e., coupled to the second terminal of the reset switch 252 and the control terminal of the current source 253. A control terminal (e.g., a gate) of the transistor M52 is coupled to the first input terminal of the comparator 251, i.e., coupled to the first terminal of the reset switch 252 and the second terminal of the capacitor 240. A first terminal (e.g., a source) of the transistor M52 receives a second voltage (a reference voltage, such as a ground voltage or other fixed voltages) different from the first voltage. A second terminal (e.g., a drain) of the transistor M52 is coupled to the output terminal of the comparator 251. The transistor M51 may convert the ramp signal RAMP into the first current signal, and the transistor M52 may convert the second terminal voltage Vfd of the capacitor 240 into the second current signal. The comparator 251 may compare the first current signal of the transistor M51 with the second current signal of the transistor M52 and output a comparison result to the control terminal of the current source 253. If the second current signal of the transistor M52 is greater, the control terminal of the current source 253 is at a low level. Comparatively, if the first current signal of the transistor M51 is greater, the control terminal of the current source 253 is at a high level.

Figure 6:
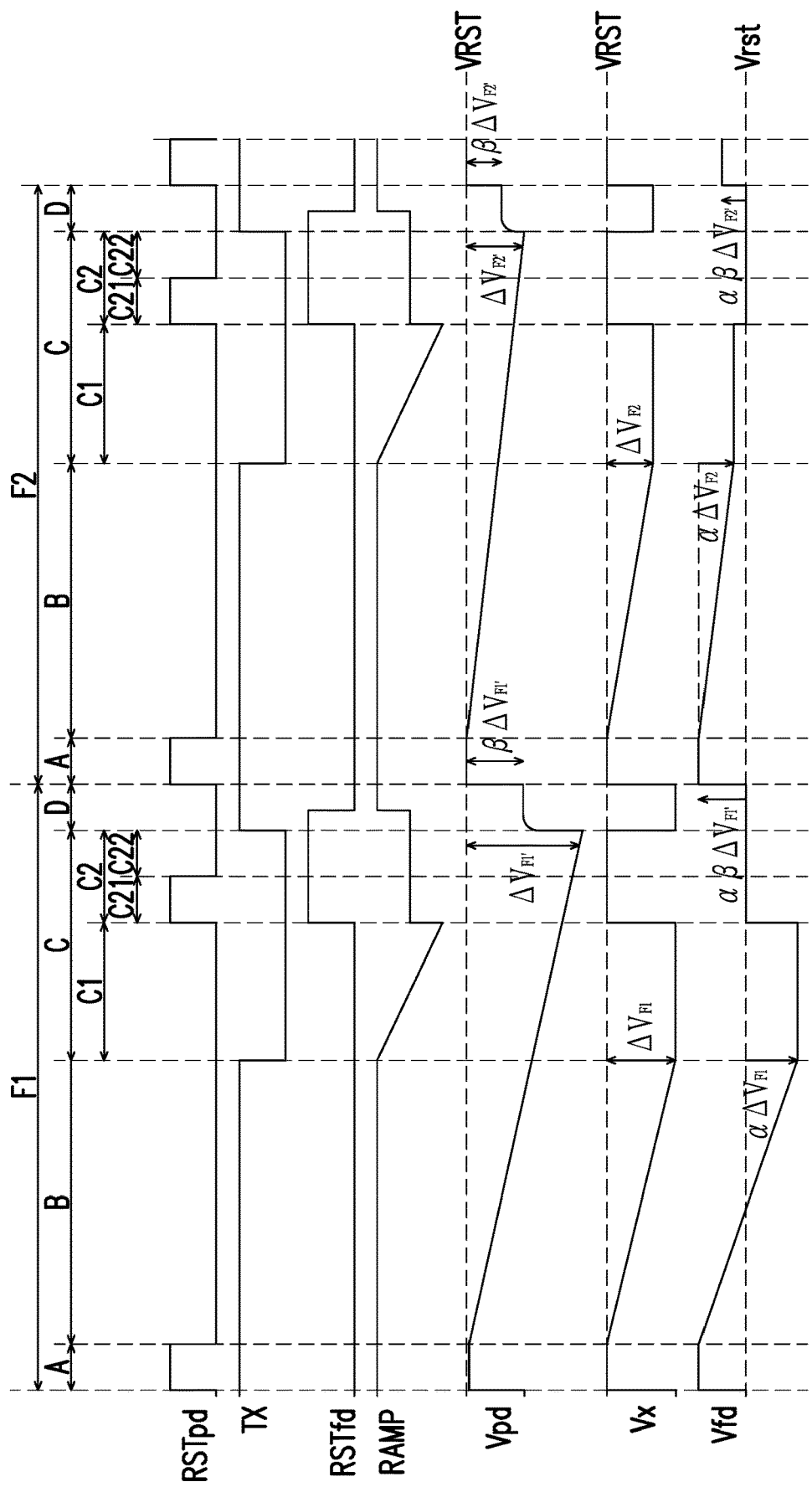
FIG. 6 is a schematic timing diagram of the signals shown in FIG. 5 when the circuit shown in FIG. 5 operates in a frame difference mode according to an embodiment of the disclosure.

FIG. 6 is a schematic timing diagram of the signals shown in FIG. 5 when the circuit shown in FIG. 5 operates in a frame difference mode according to an embodiment of the disclosure. The horizontal axis shown in FIG. 6 represents time. FIG. 6 shows two frame periods, respectively a first frame period F1 and a second frame period F2. Each frame period includes a reset period A, an exposure period B, a readout and clean-up period C, and a resample period D. Each readout and clean-up period C includes a readout period C1 and a clean-up period C2. Each clean-up period C2 includes a first sub-period C21 and a second sub-period C22. FIG. 6 shows controlling the reset signal RSTpd of the reset switch 230, controlling the sampling signal TX of the sampling switch 220, controlling the reset signal RSTfd of the reset switch 252, and controlling the ramp signal RAMP of the transistor M51.

With reference to FIG. 5 and FIG. 6 together, during the reset period A of the first frame period F1, the reset switch 230 and the sampling switch 220 are turned on, the reset switch 252 is turned off, and the ramp signal RAMP is at a disabling level (turning off the transistor M51). At this time, the voltage Vpd of the light sensing element 210 and the first terminal voltage Vx of the capacitor 240 are each reset to the level of the reset voltage VRST. The reset switch 252 is turned off during the reset period A to retain the second terminal voltage Vfd (the previous frame sensing information) of the capacitor 240.

During the exposure period B of the first frame period F1, the sampling switch 220 is turned on, the reset switches 230 and 252 are turned off, and the ramp signal RAMP is maintained at the disabling level (turning off the transistor M51). At this time, the voltage Vpd (the sensing result) of the light sensing element 210 may be sampled at the first terminal (i.e., the first terminal voltage Vx) of the capacitor 240. The voltage drop $\Delta V_{F1}$ of the first terminal voltage Vx is coupled to the second terminal of the capacitor 240 such that the voltage drop of the second terminal voltage Vfd of the capacitor 240 is $\alpha\Delta V_{F1}$, where the coefficient $\alpha$ may be expressed by Equation 1 below. In Equation 1, Cm represents the capacitance of the capacitor 240, and Cpar represents the parasitic capacitance of the electrical path to which the second terminal of the capacitor 240 is connected.

$$\alpha = \frac{Cm}{Cpar + Cm} \quad \text{Equation 1}$$

During the readout period C1 of the first frame period F1, the reset switch 230, the sampling switch 220, and the reset switch 252 are each turned off, and the ramp signal RAMP is a ramp waveform. At this time, the comparator 251 may compare the first current signal corresponding to the ramp signal RAMP with the second current signal corresponding to the second terminal voltage Vfd of the capacitor 240 and output the comparison result to the control terminal of the current source 253. When the first current signal corresponding to the ramp signal RAMP is less than the second current signal corresponding to the second terminal voltage Vfd, the current source 253 does not draw currents from the corresponding readout line COL<j>, and the corresponding readout line COL<j> is therefore at a high logic level. When the first current signal corresponding to the ramp signal RAMP is greater than the second current signal corresponding to the second terminal voltage Vfd, the current source 253 draws currents from the corresponding readout line COL<j>, and the corresponding readout line COL<j> is therefore at a low logic level. During the readout period C1, the voltage Vpd continuously drops as the light sensing element 210 is continuously exposed.

During the first sub-period C21 of the clean-up period C2 of the first frame period F1, the reset switches 230 and 252 are each turned on, the sampling switch 220 is turned off, and the ramp signal RAMP is at an enabling level (turning on the transistor M51). At this time, the first terminal voltage Vx of the capacitor 240 is reset to the level of the reset voltage VRST, and the second terminal voltage Vfd of the capacitor 240 is reset (cleaned) to the reset level Vrst. During the second sub-period C22 of the clean-up period C2 of the first frame period F1, the reset switch 252 is turned on, the reset switch 230 and the sampling switch 220 are each turned off, and the ramp signal RAMP is at an enabling level (turning on the transistor M51). During the clean-up period C2, the voltage Vpd continuously drops as the light sensing element 210 is continuously exposed.

During the resample period D of the first frame period F1, the reset switch 230 is turned off, the sampling switch 220 and the reset switch 252 are each turned on, and the ramp signal RAMP is at an enabling level (turning on the transistor M51). At this time, the voltage Vpd (the sensing result) of the light sensing element 210 may be sampled at the first terminal of the capacitor 240 such that the first terminal voltage Vx of the capacitor 240 drops. The voltage drop of the first terminal voltage Vx is $\beta\Delta V_{F1}$, where the coefficient $\beta$ may be expressed by Equation 2 below. In Equation 2, Cm represents the capacitance of the capacitor 240, and Cpd represents the junction capacitance of the light sensing element 210. At this time, the sensing result $\Delta V_{F1}$, of the light sensing element 210 during the current frame period may be sampled at the first terminal (i.e., the first terminal voltage Vx) of the capacitor 240.

$$\beta = \frac{Cpd}{Cpd + Cm} \quad \text{Equation 2}$$

During the reset period A of the second frame period F2, the reset switch 230 and the sampling switch 220 are turned on, the reset switch 252 is turned off, and the ramp signal RAMP is at a disabling level (turning off the transistor M51). At this time, the voltage Vpd of the light sensing element 210 and the first terminal voltage Vx of the capacitor 240 are each reset to the level of the reset voltage VRST. The second terminal voltage Vfd of the capacitor 240 is raised to Vrst+$\alpha\beta\Delta V_{F1}$, as the first terminal voltage Vx is pulled up.

During the exposure period B of the second frame period F2, the sampling switch 220 is turned on, the reset switches 230 and 252 are turned off, and the ramp signal RAMP is maintained at the disabling level (turning off the transistor M51). At this time, the voltage Vpd (the second sensing result) of the light sensing element 210 may be sampled at the first terminal (i.e., the first terminal voltage Vx) of the capacitor 240. The voltage drop $\Delta V_{F2}$ of the first terminal voltage Vx is coupled to the second terminal of the capacitor 240 such that the voltage drop of the second terminal voltage Vfd of the capacitor 240 is $\alpha\Delta V_{F2}$. In other words, the second terminal voltage Vfd of the capacitor 240 is Vrst+$\alpha\beta\Delta V_{F1}$−$\alpha\Delta V_{F2}$=Vrst+$\alpha(\beta\Delta V_{F1}-\alpha\Delta V_{F2})$.

During the readout period C1 of the second frame period F2, the reset switch 230, the sampling switch 220, and the reset switch 252 are each turned off, and the ramp signal RAMP is a ramp waveform. The comparator 251 may compare the ramp waveform with the second terminal voltage Vfd of the capacitor 240 to generate/output the comparison result to the control terminal of the current source 253. At this time, the second terminal voltage Vfd corresponds to the difference between the first sensing result during the first frame period F1 and the second sensing result during the second frame period F2 of the light sensing element 210. The output circuit 250 outputs the comparison result as the difference information to the readout circuit 150 through the corresponding readout line COL<j>. The readout circuit 150 counts a pulse width of the comparison result during the readout period C1 to generate light sensing difference data of the light sensing element 210 between the first frame period F1 and the second frame period F2. For the clean-up period C2 and the resample period D in the second frame period F2, analogy may be made with reference to the relevant descriptions of the clean-up period C2 and the resample period D in the first frame period F1, which therefore will not be repeated.

Figure 7:
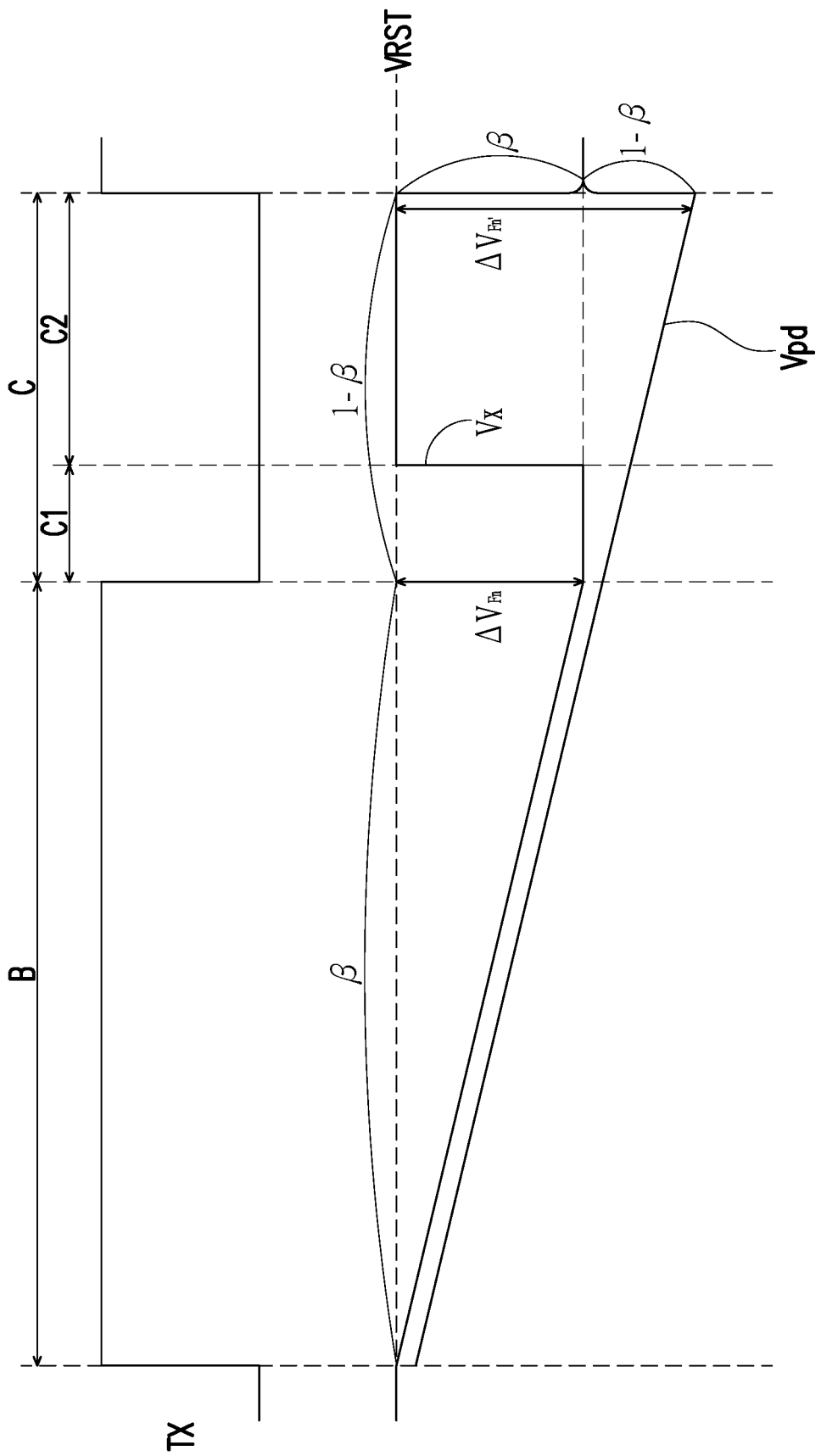
FIG. 7 is a schematic timing diagram of the sampling signal, the first terminal voltage of the capacitor, and the voltage of the light sensing element during the exposure period and the readout and clean-up period shown in FIG. 6 according to an embodiment of the disclosure.

FIG. 7 is a schematic timing diagram of the sampling signal TX, the first terminal voltage Vx of the capacitor 240, and the voltage Vpd of the light sensing element 210 during the exposure period B and the readout and clean-up period C shown in FIG. 6 according to an embodiment of the disclosure. The horizontal axis shown in FIG. 7 represents time. Reference may be made to the relevant description of the voltage drop $\Delta V_{F1}$ shown in FIG. 6 for the voltage drop $\Delta V_{Fn}$ shown in FIG. 7, and reference may be made to the relevant description of the voltage drop $\Delta V_{F1'}$ shown in FIG. 6 for the voltage drop $\Delta V_{Fn'}$ shown in FIG. 7. With reference to FIG. 6 and FIG. 7, during the readout period C1 of the second frame period F2, the second terminal voltage Vfd of the capacitor 240 is Vrst+$\alpha(\beta\Delta V_{F1}-\Delta V_{F2})$. When $\Delta V_{F1'}$ ($\Delta V_{Fn'}$ shown in FIG. 7) is equal to $\Delta V_{F1}$ ($\Delta V_{Fn}$ shown in FIG. 7) divided by $\beta$, the second terminal voltage Vfd of the capacitor 240 is Vrst+$\alpha(\Delta V_{F1}-\Delta V_{F2})$. "$\Delta V_{F1}-$ $\Delta V_{F2}$" is exactly the difference between the first sensing result $\Delta V_{F1}$ during the first frame period F1 and the second sensing result $\Delta V_{F2}$ during the second frame period F2.

The sampling switch 220 has an ON-time length during the exposure period B, and the sampling switch 220 has an OFF-time length during the readout and clean-up period C after the exposure period B. As can be seen from the triangular geometry shown in FIG. 7, to satisfy the condition "$\Delta V_{F1}=\Delta V_{F1}/\beta$", namely "$\Delta V_{Fn}=\Delta V_{Fn}/\beta$", the ratio of the length of the exposure period B (the ON-time length of the sampling switch 220) to the length of the readout and clean-up period C (the OFF-time length of the sampling switch 220) is approximately equal to the ratio of $\beta$ to $1-\beta$. Based on Equation 2 above, the ratio of $\beta$ to $1-\beta$ is equal to the ratio of the capacitance Cpd to the capacitance Cm. Therefore, the ratio of the length of the exposure period B to the length of the readout and clean-up period C is approximately equal to the ratio of the capacitance Cpd to the capacitance Cm.

Figure 8:
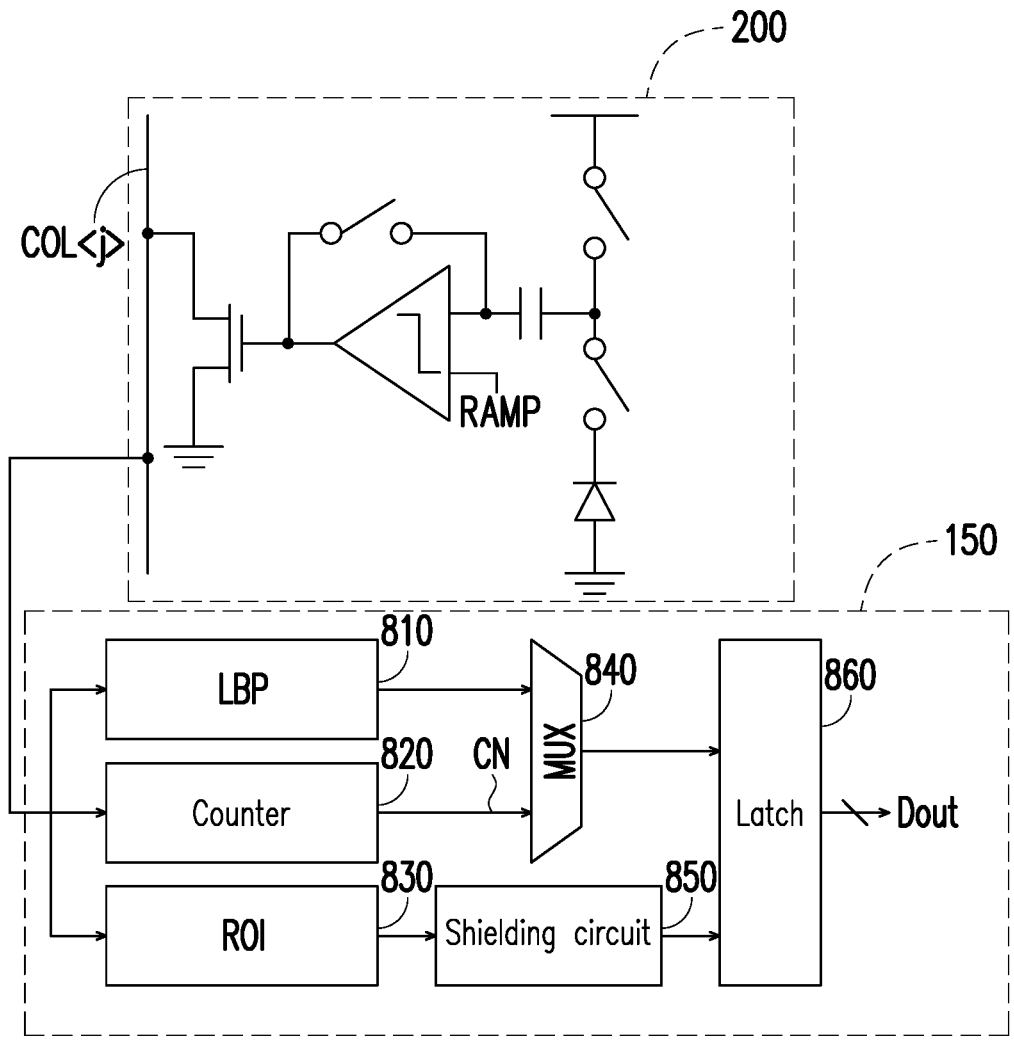
FIG. 8 is a schematic circuit block diagram of a readout circuit according to an embodiment of the disclosure.

FIG. 8 is a schematic circuit block diagram of the readout circuit 150 according to an embodiment of the disclosure. For the pixel unit 200 shown in FIG. 8, reference may be made to the relevant description of the pixel unit 200 shown in FIG. 4, which therefore will not be repeated. The readout circuit 150 shown in FIG. 8 may serve as one of many embodiments of the readout circuit 150 shown in FIG. 1 or FIG. 2. In the embodiment shown in FIG. 8, the readout circuit 150 includes a local binary pattern (LBP) circuit 810, a counter 820, a region of interest 830 (ROI) circuit, a multiplexer (MUX) 840, a shielding circuit 850, and a latch 860.

An input terminal of the counter 820 is coupled to the corresponding readout line COL<j>. The pixel unit 200 may generate the difference between the first sensing result during the first frame period F1 and the second sensing result during the second frame period F2, and compare the ramp waveform of the ramp signal RAMP with the difference. The pixel unit 200 may output the comparison result to the corresponding readout line COL<j>. The counter 820 may count the pulse width of the comparison result during the readout period C1 to generate the light sensing difference data of the light sensing element 210 between the first frame period F1 and the second frame period F2.

Figure 9:
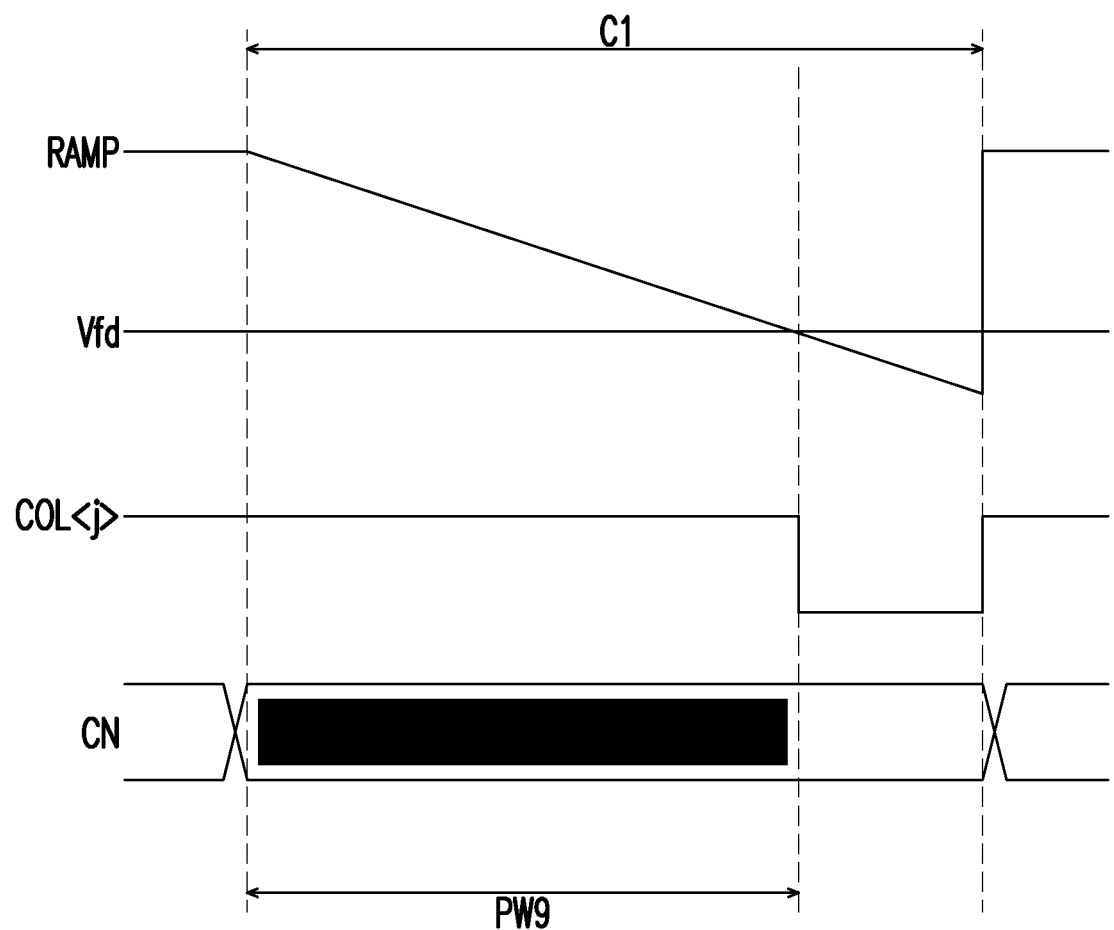
FIG. 9 is a schematic timing diagram of the ramp signal, the second terminal voltage of the capacitor, and the voltage of the corresponding readout line during the readout period according to an embodiment of the disclosure.

For example, FIG. 9 is a schematic timing diagram of the ramp signal RAMP, the second terminal voltage Vfd of the capacitor 240, and the voltage of the corresponding readout line COL<j> during the readout period C1 according to an embodiment of the disclosure. The horizontal axis shown in FIG. 9 represents time. Reference may be made to the relevant descriptions of FIG. 4, FIG. 5, FIG. 6, or FIG. 7 for the readout period C1, the ramp signal RAMP, the second terminal voltage Vfd of the capacitor 240, and the corresponding readout line COL<j> shown in FIG. 9. With reference to FIG. 4, FIG. 8, and FIG. 9, during the readout period, the comparator 251 may compare the ramp waveform of the ramp signal RAMP with the second terminal voltage Vfd of the capacitor 240, i.e., compare the first current signal corresponding to the ramp signal RAMP with the second current signal corresponding to the second terminal voltage Vfd of the capacitor 240. When the ramp signal RAMP is greater than the second terminal voltage Vfd, the voltage level of the corresponding readout line COL<j> is pulled up to a high logic level by the transistor 400. When the ramp signal RAMP is less than the second terminal voltage Vfd, the voltage level of the corresponding readout line COL<j> is pulled down to a low logic level by the current source 253. The counter 820 may count a pulse width PW9 of the voltage of the corresponding readout line COL<j> during the readout period C1 to generate a count value CN (the light sensing difference data of the light sensing element 210 between the first frame period F1 and the second frame period F2).

In summary of the foregoing, the image sensor chip 100 according to the embodiments above may perform a continuous frame difference operation. The image sensor chip 100 may store the first sensing result in the previous frame (e.g., the first frame period F1). In the current frame (e.g., the second frame period F2) after the previous frame, the image sensor chip 100 may generate the difference (e.g., $\Delta V_{F1} - \Delta V_{F2}$) between the first sensing result of the previous frame and the second sensing result of the current frame. In addition, the image sensor chip 100 may store the sensing result of the current frame to facilitate performing a continuous frame difference operation again during the next frame period.

In the embodiment shown in FIG. 8, an input terminal of the LBP circuit 810 is coupled to the corresponding readout line COL<j>. A first input terminal and a second input terminal of the multiplexer 840 are respectively coupled to an output terminal of the counter 820 and an output terminal of the LBP circuit 810. A data input terminal of the latch 860 is coupled to an output terminal of the multiplexer 840. When the image sensor chip 100 operates in the raw image mode, the frame difference mode, or the event report mode, the multiplexer 840 may select to couple the output terminal of the counter 820 to the data input terminal of the latch 860. When the image sensor chip 100 operates in the LBP mode or the ROI mode, the multiplexer 840 may select to couple the output terminal of the LBP circuit 810 to the data input terminal of the latch 860. An input terminal of the ROI circuit 830 is also coupled to the corresponding readout line COL<j>. Depending on the actual operating scenarios, the ROI circuit 830 may operate in the raw image mode, the frame difference mode, the event report mode, the LBP mode, or the ROI mode. An input terminal of the shielding circuit 850 is coupled to an output terminal of the ROI circuit 830. An output terminal of the shielding circuit 850 is coupled to an enabling terminal of the latch 860 to selectively enable/disable the latch operation of the latch 860. An output terminal of the latch 860 outputs the image stream Dout.

Figure 10:
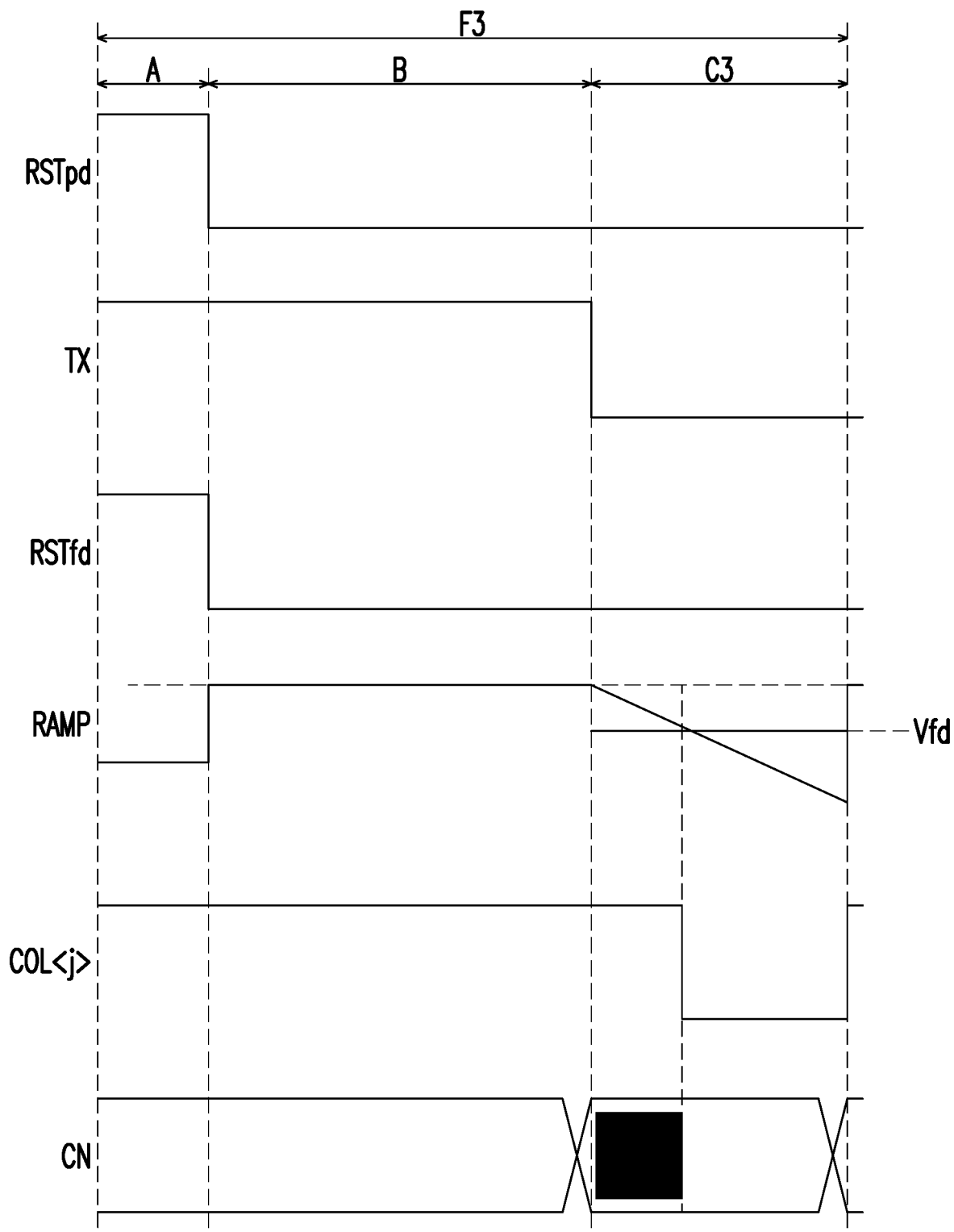
FIG. 10 is a schematic timing diagram of the reset signal, the sampling signal, the ramp signal, and the voltage of the corresponding readout line when the pixel unit operates in the raw image mode according to an embodiment of the disclosure.

FIG. 10 is a schematic timing diagram of the reset signal RSTpd, the sampling signal TX, the reset signal RSTfd, the ramp signal RAMP, and the voltage of the corresponding readout line COL<j> when the pixel unit 200 operates in the raw image mode according to an embodiment of the disclosure. The horizontal axis shown in FIG. 10 represents time. FIG. 10 shows a frame period F3 including one reset period A, one exposure period B, and at least one readout period C3. During the reset period A, the reset switch 230, the sampling switch 220, and the reset switch 252 are each turned on, and the ramp signal RAMP is at an enabling level. During the exposure period B after the reset period A, the reset switches 230 and 252 are turned off, the sampling switch 220 is turned on, and the ramp signal is at a disabling level. For the reset period A and the exposure period B shown in FIG. 10, analogy may be made with reference to the relevant descriptions of the reset period A and the exposure period B shown in FIG. 6, which therefore will not be repeated.

With reference to FIG. 4, FIG. 8, and FIG. 10, during the readout period C3 shown in FIG. 10, the reset switch 230, the sampling switch 220, and the reset switch 252 are each turned off, and the ramp signal RAMP is a ramp waveform.

The comparator 251 of the output circuit 250 may compare the ramp waveform of the ramp signal RAMP with the second terminal voltage Vfd (the current sensing result during the current frame period) of the capacitor 240, i.e., compare the first current signal corresponding to the ramp signal RAMP with the second current signal corresponding to the second terminal voltage Vfd of the capacitor 240, to generate the comparison result. When the ramp signal RAMP is greater than the second terminal voltage Vfd, the voltage level of the corresponding readout line COL<j> is pulled up to a high logic level by the transistor 400. When the ramp signal RAMP is less than the second terminal voltage Vfd, the voltage level of the corresponding readout line COL<j> is pulled down to a low logic level by the current source 253. In other words, the output circuit 250 outputs the comparison result to the readout circuit 150 through the corresponding readout line COL<j>. The readout circuit 150 may count a pulse width of the comparison result during the readout period C3 to generate light sensing data of the light sensing element 210 during the current frame period. In other words, the counter 820 may count a pulse width of the voltage of the corresponding readout line COL<j> during the readout period C3 to generate the count value CN (the light sensing data of the light sensing element 210 during the frame period F3).

Figures 11A, 11B, 11C:
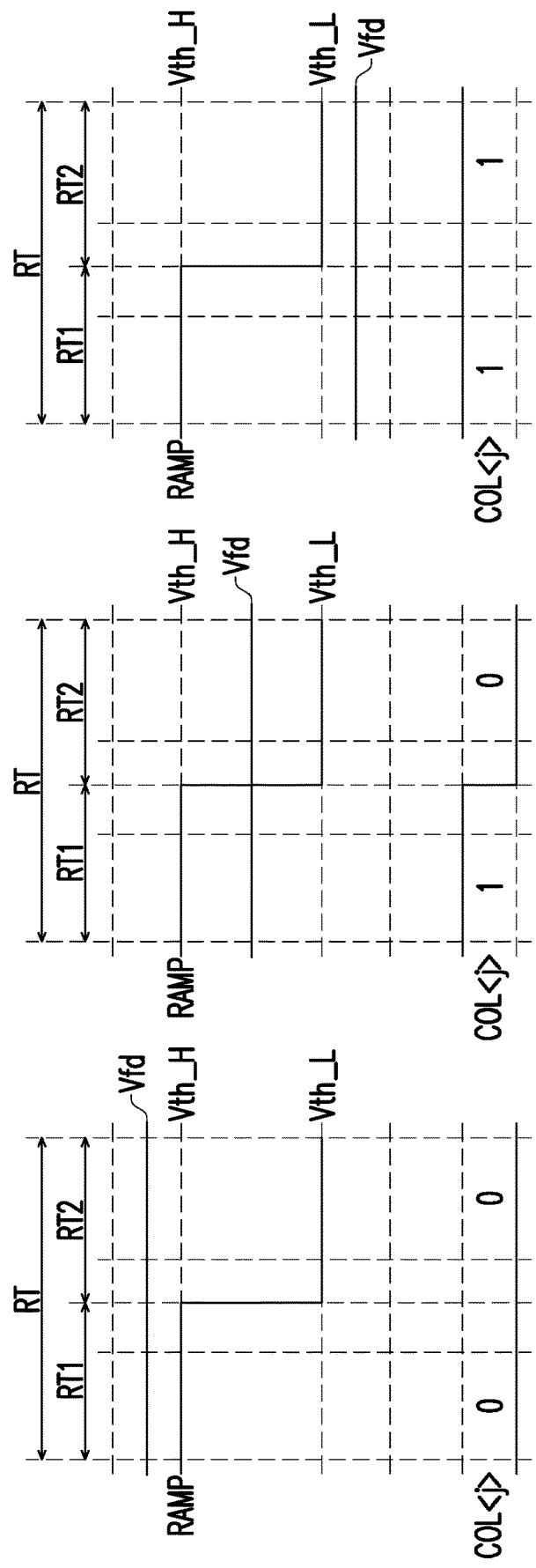
FIG. 11A, FIG. 11B, and FIG. 11C are schematic timing diagrams of the second terminal voltage of the capacitor, the ramp signal, and the voltage of the corresponding readout line in different scenarios when the pixel unit operates in the event report mode according to an embodiment of the disclosure.

FIG. 11A, FIG. 11B, and FIG. 11C are schematic timing diagrams of the second terminal voltage Vfd of the capacitor 240, the ramp signal RAMP, and the voltage of the corresponding readout line COL<j> in different scenarios when the pixel unit 200 operates in the event report mode according to an embodiment of the disclosure. The horizontal axis shown in each of FIG. 11A, FIG. 11B, and FIG. 11C represents time. FIG. 11A, FIG. 11B, and FIG. 11C show a row time RT, which corresponds to the readout period C1 shown in FIG. 6, while other periods (e.g., the reset period A, the exposure period B, the clean-up period C2, and the resample period D) are not shown. For other periods not shown in FIG. 11A, FIG. 11B and FIG. 11C, reference may be made to the relevant descriptions of the reset period A, the exposure period B, the clean-up period C2, and the resample period D shown in FIG. 6, which therefore will not be repeated here.

During the row time RT (the readout period), the reset switch 230, the sampling switch 220, and the reset switch 252 are turned off. At this time, the second terminal voltage Vfd of the capacitor 240 is Vrst+α($\Delta V_{Fn}-\Delta V_{Fn+1}$), where $\Delta V_{Fn}$ and $\Delta V_{Fn+1}$ are respectively two sensing results (e.g., $\Delta V_{F1}$ and $\Delta V_{F2}$ shown in FIG. 6) of two adjacent frame periods. During a first sub-period RT1 of the row time RT (the readout period), the ramp signal RAMP is at a first threshold level Vth_H different from the disabling level. During a second sub-period RT2 of the row time RT (the readout period), the ramp signal RAMP is at a second threshold level Vth_L different from the disabling level and the first threshold level Vth_H. The first threshold level Vth_H and the second threshold level Vth_L may be determined depending on the actual design.

In the operating scenario shown in FIG. 11A, $\Delta V_{Fn}$ is greater than $\Delta V_{Fn+1}$, so the second terminal voltage Vfd of the capacitor 240 is greater than the first threshold level Vth_H and the second threshold level Vth_L. The comparison result during the first sub-period RT1 and the comparison result during the second sub-period RT2 of the output circuit 250 are each logic "1". In other words, the voltage of the corresponding readout line COL<j> is at a low level (logic "0"). The voltage of the corresponding readout line COL<j> being logic "0" during each of the sub-periods RT1 and RT2 indicates that $\Delta V_{Fn}$ of the previous frame is greater than $\Delta V_{Fn+1}$ of the current frame. In other words, the pixel unit 200 senses that the incident light changes from bright to dark.

In the operating scenario shown in FIG. 11B, $\Delta V_{Fn}$ is approximately equal to $\Delta V_{Fn+1}$, so the second terminal voltage Vfd of the capacitor 240 is less than the first threshold level Vth_H during the first sub-period RT1 and greater than the second threshold level Vth_L during the second sub-period RT2. The comparison result of the output circuit 250 during the first sub-period RT1 is a logic "0". In other words, the voltage of the corresponding readout line COL<j> is at a high level (logic "1"). The comparison result of the output circuit 250 during the second sub-period RT2 is logic "1". In other words, the voltage of the corresponding readout line COL<j> is at a low level (logic "0"). The voltage of the corresponding readout line COL<j> being logic "1" and logic "0" during the sub-periods RT1 and RT2 indicates that $\Delta V_{Fn}$ of the previous frame is approximately equal to $\Delta V_{Fn+1}$ of the current frame. In other words, the pixel unit 200 senses that the incident light does not change significantly.

In the operating scenario shown in FIG. 11C, $\Delta V_{Fn}$ is less than $\Delta V_{Fn+1}$, so the second terminal voltage Vfd of the capacitor 240 is less than the first threshold level Vth_H and the second threshold level Vth_L. The comparison result during the first sub-period RT1 and the comparison result during the second sub-period RT2 of the output circuit 250 are each logic "0". In other words, the voltage of the corresponding readout line COL<j> is at a high level (logic "1"). The voltage of the corresponding readout line COL<j> being logic "1" during each of the sub-periods RT1 and RT2 indicates that $\Delta V_{Fn}$ of the previous frame is less than $\Delta V_{Fn+1}$ of the current frame. In other words, the pixel unit 200 senses that the incident light changes from dark to bright.

Figure 12:
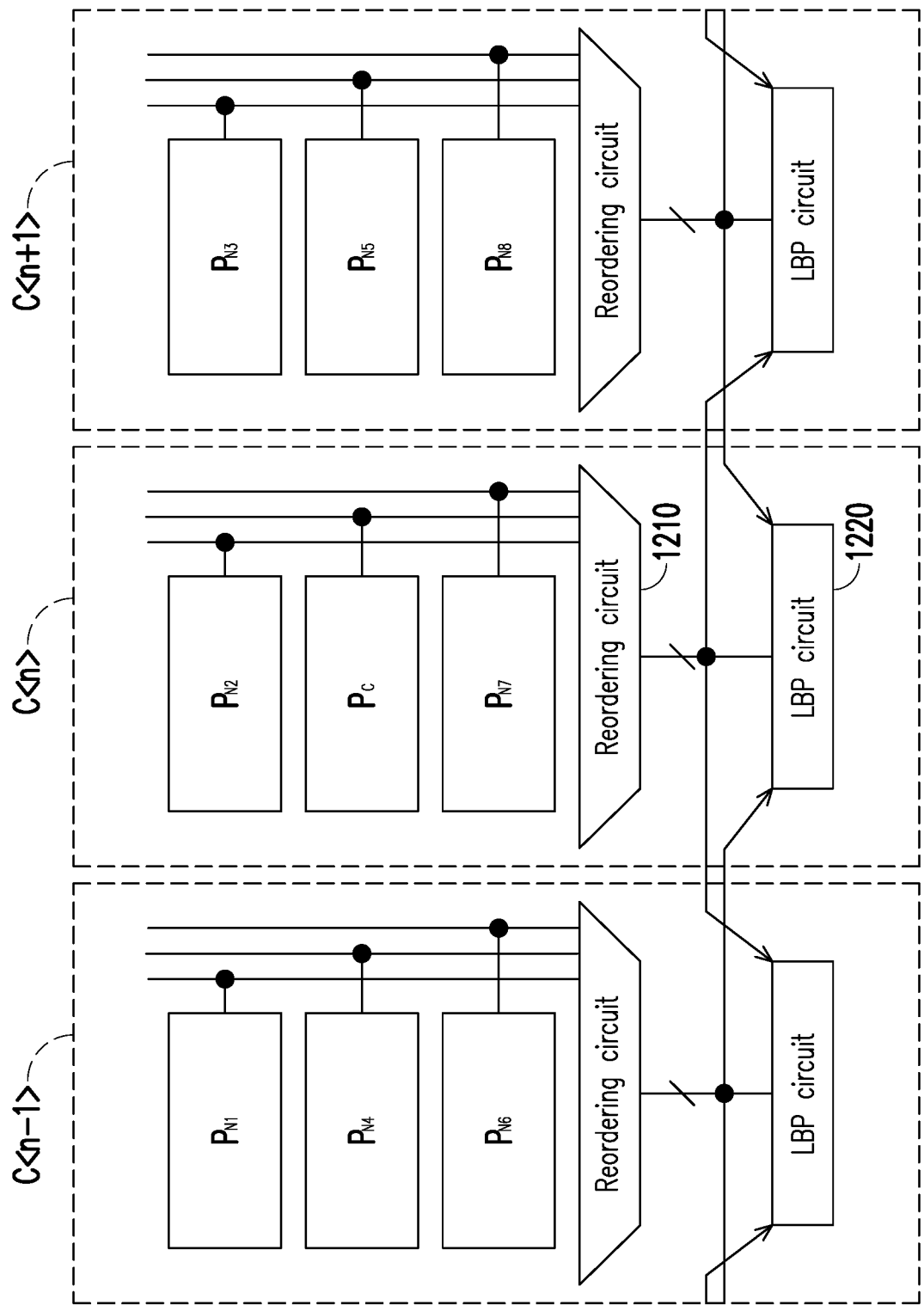
FIG. 12 is a schematic circuit block diagram of an image sensor chip according to an embodiment of the disclosure.

FIG. 12 is a schematic circuit block diagram of an image sensor chip according to an embodiment of the disclosure. FIG. 12 shows some pixel units $P_{N1}$, $P_{N2}$, $P_{N3}$, $P_{N4}$, $P_C$, $P_{N5}$, $P_{N6}$, $P_{N7}$, and $P_{N8}$ in one pixel array of the image sensor chip. For the pixel unit $P_C$ and the pixel units $P_{N1}$ to $P_{N8}$ shown in FIG. 12, reference may be made to the relevant description of the pixel unit 141 shown in FIG. 1 or the relevant description of the pixel unit 200 shown in FIG. 2, FIG. 4, FIG. 5, or FIG. 8, which will not be repeated. The LBP circuit shown in FIG. 12 may serve as one of many embodiments of the LBP circuit 810 shown in FIG. 8.

A reordering circuit and an LBP circuit are disposed for each column of pixel units. For example, a reordering circuit 1210 and an LBP circuit 1220 are disposed for a pixel unit column C<n>. Based on the scanning timing for the pixel array by the row control circuit 120 during each frame period, the reordering circuit 1210 may dynamically configure the connection sequence between three readout lines of the pixel unit column C<n> and the LBP circuit 1220. For other pixel unit columns (e.g., C<n−1> and C<n+1> shown in FIG. 12) of the pixel array, analogy may be made with reference to the relevant description of the pixel unit column C<n>, which therefore will not be repeated.

Figure 13:
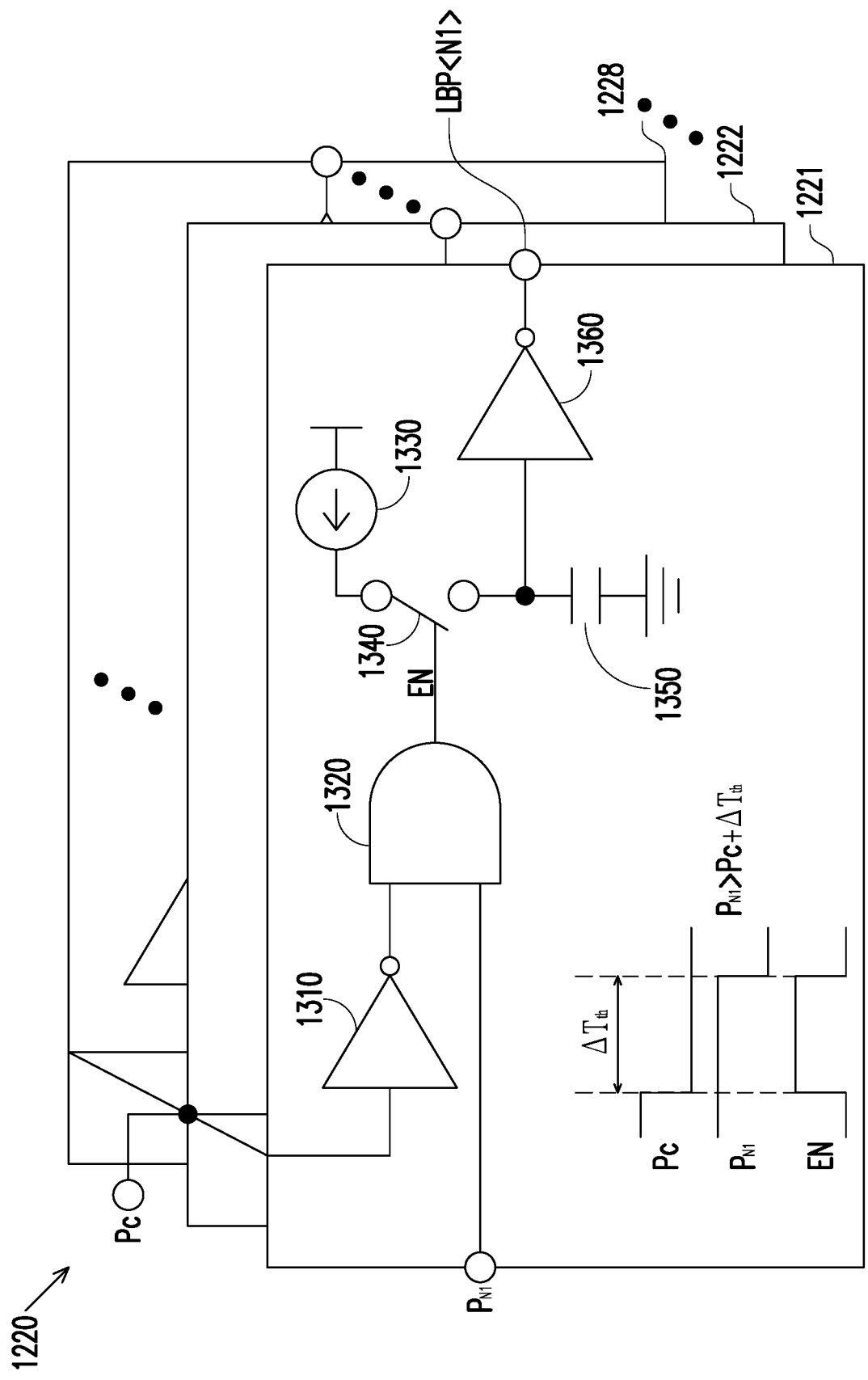
FIG. 13 is a schematic circuit block diagram of the LBP circuit shown in FIG. 12 according to an embodiment of the disclosure.

FIG. 13 is a schematic circuit block diagram of the LBP circuit 1220 shown in FIG. 12 according to an embodiment of the disclosure. For the LBP circuits of other pixel unit columns C<n−1> and C<n+1> of the pixel array, analogy may be made with reference to the relevant description of the LBP circuit 1220 of the pixel unit column C<n>, which therefore will not be repeated. The LBP circuit 1220 shown in FIG. 13 includes eight unit circuits 1221, 1222, . . . , 1228. First input terminals of the unit circuits 1221 to 1228 are commonly coupled to an output circuit of a current pixel unit (e.g., the pixel unit $P_C$ shown in FIG. 12) through the reordering circuit 1210 and the corresponding readout line. Second input terminals of the unit circuits 1221 to 1228 are coupled to output circuits of adjacent pixel units (e.g., the pixel units $P_{N1}$ to $P_{N8}$ shown in FIG. 12) of the current pixel unit in a one-to-one correspondence through the reordering circuit and the readout line. For example, the second input terminal of the unit circuit 1221 is coupled to the output circuit of the pixel unit $P_{N1}$ through the reordering circuit and the readout line of the pixel unit column C<n−1>.

For other unit circuits 1222 to 1228 of the LBP circuit 1220, analogy may be made with reference to the relevant description of the unit circuit 1221. The unit circuit 1221 includes a NOT gate 1310, an AND gate 1320, a current source 1330, a switch 1340, a capacitor 1350, and a NOT gate 1360. A first terminal of the switch 1340 is coupled to the current source 1330. A first terminal and a second terminal of the capacitor 1350 are respectively coupled to a second terminal of the switch 1340 and a reference voltage (e.g., a ground voltage or other fixed voltages). An input terminal of the NOT gate 1310 is coupled to the corresponding readout line through the reordering circuit 1210. Therefore, the NOT gate 1310 may be coupled to the output circuit of the current pixel unit (e.g., the pixel unit $P_C$ shown in FIG. 12) through the reordering circuit 1210 and the corresponding readout line.

A first input terminal of the AND gate 1320 is coupled to an output terminal of the NOT gate 1310. A second input terminal of the AND gate 1320 is coupled to an adjacent readout line that is coupled to the pixel unit $P_{N1}$ (the adjacent pixel unit) through the corresponding reordering circuit. An output terminal of the AND gate 1320 is coupled to a control terminal of the switch 1340 to provide a switch signal EN. An input terminal of the NOT gate 1360 is coupled to the second terminal of the switch 1340. An output terminal of the NOT gate 1360 outputs an LBP bit value LBP<N1> related to the pixel unit $P_{N1}$. Therefore, the unit circuit 1221 may compare difference information of the current pixel unit (e.g., the pixel unit $P_C$ shown in FIG. 12) with difference information of the surrounding 8 adjacent pixel units (e.g., the pixel units $P_{N1}$ to $P_{N8}$ shown in FIG. 12). Taking the LBP bit value LBP<N1> as an example, when the difference information of the pixel unit $P_{N1}$ is greater than the difference information of the pixel unit $P_C$, the LBP bit value LBP<N1> is 1. Comparatively, when the difference information of the pixel unit $P_{N1}$ is less than the difference information of the pixel unit $P_C$, the LBP bit value LBP<N1> is 0. As such, the LBP circuit 1220 may output 8-bit LBP codes related to the current pixel unit (e.g., the pixel unit $P_C$ shown in FIG. 12) to the next-stage circuit (not shown).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image sensor chip comprising:
 a pixel array comprising a plurality of pixel units, wherein each of the pixel units comprises:
  a first reset switch having a first terminal coupled to a reset voltage;
  a sampling switch having a first terminal coupled to a second terminal of the first reset switch;
  a light sensing element coupled to a second terminal of the sampling switch;
  a first capacitor having a first terminal coupled to the first terminal of the sampling switch; and
  an output circuit coupled between a second terminal of the first capacitor and one corresponding readout line of a plurality of readout lines of the pixel array, wherein
  the output circuit in the pixel unit outputs difference information corresponding to a difference between a first sensing result during a first frame period and a second sensing result during a second frame period after the first frame period of the light sensing element to the corresponding readout line when the pixel array operates in a frame difference mode,
  wherein the sampling switch has an ON-time length during an exposure period, the sampling switch has an OFF-time length during a readout and clean-up period after the exposure period, and a ratio of the ON-time length to the OFF-time length is related to a ratio of a capacitance of the light sensing element to a capacitance of the first capacitor.

2. The image sensor chip of claim 1, wherein the light sensing element comprises a photodiode.

3. The image sensor chip of claim 1, wherein when the pixel unit operates in the frame difference mode:
 the first reset switch is turned on during a reset period;
 the first reset switch is turned off after during the exposure period and a readout period in the readout and clean-up period after the reset period;
 the first reset switch is turned on during a first sub-period of a clean-up period in the readout and clean-up period; and
 the first reset switch is turned off during a second sub-period of the clean-up period and a resample period after the second sub-period.

4. The image sensor chip of claim 1, wherein when the pixel unit operates in the frame difference mode:
 the sampling switch is turned on during a reset period and the exposure period after the reset period;
 the sampling switch is turned off during the readout and clean-up period; and
 the sampling switch is turned on during a resample period after the readout and clean-up period.

5. The image sensor chip of claim 1, wherein the output circuit comprises:
 a comparator having a first input terminal coupled to the second terminal of the first capacitor, wherein a second input terminal of the comparator is adapted to receive a ramp signal;
 a second reset switch having a first terminal and a second terminal respectively coupled to the second terminal of the first capacitor and an output terminal of the comparator; and
 a first current source having a control terminal coupled to the output terminal of the comparator, wherein a current terminal of the first current source is coupled to the corresponding readout line.

6. The image sensor chip of claim 5, wherein when the pixel unit operates in the frame difference mode:
 the first reset switch and the sampling switch are turned on during a reset period to reset the light sensing element; and
 the second reset switch is turned off during the reset period to retain previous frame sensing information in the first capacitor.

7. The image sensor chip of claim 5, wherein the ramp signal is at a disabling level during a reset period and the exposure period after the reset period, the ramp signal is a ramp waveform during a readout period in the readout and clean-up period, and the ramp signal is at an enabling level during a clean-up period in the readout and clean-up period and a resample period after the clean-up period.

8. The image sensor chip of claim 5, wherein the second reset switch is turned off during a reset period, the exposure period after the reset period, and a readout period in the readout and clean-up period, and the second reset switch is turned on during a clean-up period in the readout and clean-up period and a resample period after the clean-up period.

9. The image sensor chip of claim 5, wherein when the pixel unit operates in a raw image mode:
the first reset switch, the sampling switch, and the second reset switch are turned on, and the ramp signal is at an enabling level during a reset period;
the first reset switch and the second reset switch are turned off, the sampling switch is turned on, and the ramp signal is at a disabling level during the exposure period after the reset period; and
the first reset switch, the sampling switch, and the second reset switch are turned off, and the ramp signal is a ramp waveform during a readout period after the exposure period.

10. The image sensor chip of claim 5, wherein when the pixel unit operates in an event report mode:
the first reset switch and the sampling switch are turned on, the second reset switch is turned off, and the ramp signal is at a disabling level during a reset period;
the first reset switch and the second reset switch are turned off, the sampling switch is turned on, and the ramp signal is at the disabling level during the exposure period after the reset period;
the first reset switch, the sampling switch, and the second reset switch are turned off, and the ramp signal is at a first threshold level different from the disabling level during a first sub-period of a readout period in the readout and clean-up period after the exposure period; and
the first reset switch, the sampling switch, and the second reset switch are turned off, and the ramp signal is at a second threshold level different from the disabling level and the first threshold level during a second sub-period of the readout period.

11. The image sensor chip of claim 5, wherein the comparator comprises:
a first transistor having a control terminal coupled to the second input terminal of the comparator to receive the ramp signal, wherein a first terminal of the first transistor receives a first voltage, and a second terminal of the first transistor is coupled to the output terminal of the comparator; and
a second transistor having a control terminal coupled to the first input terminal of the comparator, wherein a first terminal of the second transistor receives a second voltage different from the first voltage, and a second terminal of the second transistor is coupled to the output terminal of the comparator.

12. The image sensor chip of claim 1 further comprising:
a readout circuit coupled to the readout lines of the pixel array, wherein
when the output circuit operates in the frame difference mode, the output circuit compares the difference between the first sensing result during the first frame period and the second sensing result during the second frame period of the light sensing element with a ramp signal to generate a comparison result during a readout period after the exposure period, the output circuit outputs the comparison result as the difference information to the readout circuit through the corresponding readout line, and the readout circuit counts a pulse width of the comparison result during the readout period to generate light sensing difference data of the light sensing element between the first frame period and the second frame period.

13. The image sensor chip of claim 12, wherein when the output circuit operates in a raw image mode:
the output circuit compares a current sensing result of the light sensing element during a current frame period with the ramp signal to generate a comparison result during the readout period;
the output circuit outputs the comparison result to the readout circuit through the corresponding readout line; and
the readout circuit counts a pulse width of the comparison result during the readout period to generate light sensing data of the light sensing element during the current frame period.

14. The image sensor chip of claim 12, wherein the readout circuit comprises:
a counter having an input terminal coupled to the corresponding readout line;
a local binary pattern circuit having an input terminal coupled to the corresponding readout line;
a multiplexer having a first input terminal and a second input terminal respectively coupled to an output terminal of the counter and an output terminal of the local binary pattern circuit; and
a latch having a data input terminal coupled to an output terminal of the multiplexer.

15. The image sensor chip of claim 14, wherein the local binary pattern circuit comprises a plurality of unit circuits, and each of the unit circuits comprises:
a current source;
a first switch having a first terminal coupled to the current source;
a second capacitor having a first terminal and a second terminal respectively coupled to a second terminal of the first switch and a reference voltage;
a first NOT gate having an input terminal coupled to the corresponding readout line;
an AND gate having a first input terminal and a second input terminal respectively coupled to an output terminal of the first NOT gate and an adjacent readout line coupled to an adjacent pixel unit, wherein an output terminal of the AND gate is coupled to a control terminal of the first switch; and
a second NOT gate having an input terminal coupled to the second terminal of the first switch.

16. The image sensor chip of claim 14, wherein the readout circuit further comprises:
a region of interest circuit having an input terminal coupled to the corresponding readout line; and
a shielding circuit having an input terminal coupled to an output terminal of the region of interest circuit, wherein an output terminal of the shielding circuit is coupled to an enabling terminal of the latch.

17. A sensing method of an image sensor chip, the image sensor chip comprising a pixel array, the pixel array comprising a plurality of pixel units, each of the pixel units comprising a first reset switch, a sampling switch, a light sensing element, a first capacitor, and an output circuit, the sensing method comprising:
    turning on the sampling switch during an exposure period when the pixel array operates in a frame difference mode, wherein the sampling switch has an ON-time length during the exposure period, a first terminal of the first reset switch is coupled to a reset voltage, a first terminal of the sampling switch is coupled to a second terminal of the first reset switch, the light sensing element is coupled to a second terminal of the sampling switch, a first terminal of the first capacitor is coupled to the first terminal of the sampling switch, and the output circuit is coupled between a second terminal of the first capacitor and one corresponding readout line of a plurality of readout lines of the pixel array;
    turning off the sampling switch during a readout and clean-up period after the exposure period when the pixel array operates in the frame difference mode, wherein the sampling switch has an OFF-time length during the readout and clean-up period, and a ratio of the ON-time length to the OFF-time length is related to a ratio of a capacitance of the light sensing element to a capacitance of the first capacitor; and
    outputting difference information corresponding to a difference between a first sensing result during a first frame period and a second sensing result during a second frame period after the first frame period of the light sensing element to the corresponding readout line by the output circuit in the pixel unit when the pixel array operates in the frame difference mode.

18. The sensing method of claim 17, wherein the light sensing element comprises a photodiode.

19. The sensing method of claim 17 further comprising, when the pixel unit operates in the frame difference mode:
    turning on the first reset switch during a reset period;
    turning off the first reset switch during the exposure period after the reset period and a readout period in the readout and clean-up period;
    turning on the first reset switch during a first sub-period of a clean-up period in the readout and clean-up period; and
    turning off the first reset switch during a second sub-period of the clean-up period and a resample period after the second sub-period.

20. The sensing method of claim 17 further comprising, when the pixel unit operates in the frame difference mode:
    turning on the sampling switch during a reset period and the exposure period after the reset period;
    turning off the sampling switch during the readout and clean-up period; and
    turning on the sampling switch during a resample period after the readout and clean-up period.

21. The sensing method of claim 17 further comprising, when the pixel unit operates in the frame difference mode:
    turning on the first reset switch and the sampling switch during a reset period to reset the light sensing element; and
    turning off a second reset switch of the output circuit during the reset period to retain previous frame sensing information in the first capacitor, wherein
    a first input terminal of a comparator of the output circuit is coupled to the second terminal of the first capacitor, a second input terminal of the comparator is adapted to receive a ramp signal, a first terminal and a second terminal of the second reset switch are respectively coupled to the second terminal of the first capacitor and an output terminal of the comparator, a control terminal of a first current source of the output circuit is coupled to the output terminal of the comparator, and a current terminal of the first current source is coupled to the corresponding readout line.

22. The sensing method of claim 21, wherein the ramp signal is at a disabling level during the reset period and the exposure period after the reset period, the ramp signal is a ramp waveform during a readout period in the readout and clean-up period, and the ramp signal is at an enabling level during a clean-up period in the readout and clean-up period and a resample period after the clean-up period.

23. The sensing method of claim 21 further comprising:
    turning off the second reset switch during the reset period, the exposure period after the reset period, and a readout period in the readout and clean-up period; and
    turning on the second reset switch during a clean-up period in the readout and clean-up period and a resample period after the clean-up period.

24. The sensing method of claim 21 further comprising, when the pixel unit operates in a raw image mode:
    turning on the first reset switch, the sampling switch, and the second reset switch, and making the ramp signal at an enabling level during the reset period;
    turning off the first reset switch and the second reset switch, turning on the sampling switch, and making the ramp signal at a disabling level during the exposure period after the reset period; and
    turning off the first reset switch, the sampling switch, and the second reset switch, and making the ramp signal a ramp waveform during a readout period after the exposure period.

25. The sensing method of claim 21 further comprising, when the pixel unit operates in an event report mode:
    turning on the first reset switch and the sampling switch, turning off the second reset switch, and making the ramp signal at a disabling level during the reset period;
    turning off the first reset switch and the second reset switch, turning on the sampling switch, and making the ramp signal at the disabling level during the exposure period after the reset period;
    turning off the first reset switch, the sampling switch, and the second reset switch, and making the ramp signal at a first threshold level different from the disabling level during a first sub-period of a readout period in the readout and clean-up period after the exposure period; and
    turning off the first reset switch, the sampling switch, and the second reset switch, and making the ramp signal at a second threshold level different from the disabling level and the first threshold level during a second sub-period of the readout period.

26. The sensing method of claim 17 further comprising, when the output circuit operates in the frame difference mode:
    comparing the difference between the first sensing result during the first frame period and the second sensing result during the second frame period of the light sensing element with a ramp signal to generate a comparison result during a readout period after the exposure period by the output circuit;
    outputting the comparison result as the difference information to a readout circuit of the image sensor chip through the corresponding readout line by the output circuit; and
    counting a pulse width of the comparison result during the readout period to generate light sensing difference data of the light sensing element between the first frame period and the second frame period by the readout circuit.

27. The sensing method of claim 26 further comprising, when the output circuit operates in a raw image mode:
   comparing a current sensing result of the light sensing element during a current frame period with the ramp signal to generate a comparison result during the readout period by the output circuit;
   outputting the comparison result to the readout circuit through the corresponding readout line by the output circuit; and
   counting a pulse width of the comparison result during the readout period to generate light sensing data of the light sensing element during the current frame period by the readout circuit.

* * * * *